United States Patent [19]

Gupta et al.

[11] 4,262,495
[45] Apr. 21, 1981

[54] CABIN-AIR RECIRCULATION SYSTEM POWERED BY CABIN-TO-AMBIENT PRESSURE DIFFERENTIAL

[75] Inventors: Alankar Gupta, Renton; Joe N. Runnels, Bellevue, both of Wash.

[73] Assignee: The Boeing Company, Seattle, Wash.

[21] Appl. No.: 76,979

[22] Filed: Sep. 20, 1979

[51] Int. Cl.³ ............................................. F25D 9/00
[52] U.S. Cl. ...................................... 62/402; 62/87; 62/89; 62/172
[58] Field of Search ................... 62/86, 87, 89, 90, 95, 62/172, 402

[56] References Cited

U.S. PATENT DOCUMENTS

| | | | |
|---|---|---|---|
| 2,473,496 | 6/1949 | Mayer | 62/172 |
| 2,477,931 | 8/1949 | King | 62/402 |
| 2,477,932 | 8/1949 | King | 62/402 |
| 2,491,461 | 12/1949 | Wood | 62/172 |
| 2,491,462 | 12/1949 | Wood | 62/172 |
| 2,628,481 | 2/1953 | Scofield et al. | 62/402 |
| 2,734,356 | 2/1956 | Keinhans | 62/402 |
| 2,767,591 | 10/1956 | Seeger | 62/87 |
| 2,777,301 | 1/1957 | Kuhn | 62/402 |
| 2,782,613 | 2/1957 | Addie | 62/402 |
| 2,800,002 | 7/1957 | Seed | 62/402 |
| 2,851,254 | 9/1958 | Messinger | 62/172 |
| 3,097,508 | 7/1963 | Leech et al. | 62/402 |
| 3,177,679 | 4/1965 | Quick et al. | 62/402 |
| 3,222,883 | 12/1965 | Glaspie | 62/172 |
| 3,877,246 | 4/1975 | Schutze | 62/402 |
| 4,018,060 | 4/1977 | Kinsell et al. | 62/402 |
| 4,021,215 | 5/1977 | Rosenbush et al. | 62/402 |

Primary Examiner—Ronald C. Capossela
Attorney, Agent, or Firm—Christensen, O'Connor, Johnson & Kindness

[57] ABSTRACT

In an air conditioning system for an aircraft cabin, stale air is withdrawn from the cabin, then filtered, compressed and cooled in a recirculation loop which returns the reconditioned air to an air distribution manifold that supplies the cabin with fresh air. The compression stage moves the air through the recirculation loop and is provided by an air compressor driven by a power turbine that is in turn rotated by a flow of cabin air to an overboard exhaust nozzle caused by a cabin-to-ambient pressure differential. Cooling is provided by an air/air heat exchanger that transfers heat from the recirculation air, warmed by the compression stage, to cooler air discharged from the output side of the power turbine and flowing to the overboard exhaust nozzle. In one embodiment, the foregoing recirculation loop is integrated with an air cycle machine refrigeration stage of a conventional cabin air conditioning system supplied by fresh engine bleed air. The filtered, compressed and cooled recirculation air is combined with the fresh air delivered by the output turbine stage of the air cycle machine, and spent air from the discharge side of the recirculation power turbine is, prior to being discharged overboard, ducted through a primary heat exchanger used for cooling of the fresh engine bleed air that supplies the air cycle machine. In an alternate embodiment, the cabin-to-ambient pressure differential for driving the recirculation loop power turbine is obtained from pressurized air (normally dumped directly overboard) in an avionics compartment of the aircraft, and the supply of stale cabin air for recirculation is provided by air drawn from a cargo compartment of the aircraft, which has air that is normally cooler than cabin air, thus eliminating the need for post-compression cooling of the recirculation air.

10 Claims, 4 Drawing Figures

CABIN-AIR RECIRCULATION SYSTEM POWERED BY CABIN-TO-AMBIENT PRESSURE DIFFERENTIAL

BACKGROUND

The present invention pertains to the recirculation of cabin air in an air conditioning system for a pressurized aircraft of the type in which fresh air is initially supplied to the cabin by bleeding air from one or more of the aircraft's engines and then conditioning such bleed air before introducing it into the pressurized fuselage shell.

Most turbojet aircraft used by commercial carriers and by the military, have cabin air conditioning systems that tap engine bleed air, condition it in a refrigeration pack, and then introduce the fresh air into the pressurized compartments of the aircraft. Typically, the fresh air conditioning is done in an Air Cycle Machine (ACM) refrigeration pack in which the bleed air is cooled by a combination of exchanging heat between the hot bleed air and cooler outside ambient air, and extracting work from the bleed air. First, the bleed air is compressed, and it is then allowed to expand in an expansion turbine, which cools the bleed air and in doing so performs work that is harnessed to drive the compressor. In some modern versions of ACM (three-wheel machines) part of the turbine work is absorbed by a fan that induces ambient air through the heat exchangers. In other aircraft air conditioning systems the bleed air is conditioned by a Vapor Cycle Refrigeration pack.

It has long been recognized that the use of bleed air in conjunction with ACM refrigeration has a number of shortcomings, including a primary disadvantage resulting from the amount of fuel that must be burned by the engines to support the aircraft's air conditioning system. The ACM expends fuel both in terms of the amount of engine bleed air that must be supplied to it, and in terms of the amount of drag on the aircraft attributable to the quantity of cooler ambient air that must be ingested for providing heat sinking for the bleed air. Although numerous improvements have been proposed, such as disclosed in U.S. Pat. Nos. 3,177,679 by D.F.J. Quick et al., in an effort to improve the overall efficiency of this type of aircraft air conditioning system, the inherent characteristics of cooling engine bleed air by an ACM result in a significant fuel burn penalty that thus far has not been satisfactorily overcome.

The above disadvantage of available air conditioning systems becomes even more acute when they are used in conjunction with today's high-bypass ratio engines, as contrasted with the now less popular low-bypass ratio engines. A high-bypass ratio engine has significantly greater constraints on the amount of bleed air that can be safely tapped from the engine before seriously interferring with the engine's performance. Thus, in order to provide a suitable cabin ventilation rate it is necessary to compete with the limited availability of bleed air that can be supplied by a high-bypass engine while still maintaining optimum performance.

Improvements have been proposed for reducing the dependence of cabin ventilation on the availability of engine bleed air to reduce operating penalty and engine thrust loss. For example, on the Model 747 aircraft, manufactured by The Boeing Company of Seattle, Wash., passenger cabin air is recirculated by electrically-powered ventilation fans that withdraw stale air from the cabin, force it through air filters and return it to the cabin. The electrically-powered recirculation fans do not provide additional cooling capacity. They in fact, impose additional cooling load on the ACM due to the energy they expend in recirculating cabin air. Also, the electrical power consumed by the recirculation fans adds to the fuel-burn penalty attributed to the air conditioning system since the on-board electrical generators are powered by the aircraft engines during flight.

Other known air conditioning systems have provided for recirculation of cabin air by withdrawing stale air from the cabin, compressing it and mixing the thusly compressed recirculation air in with the primary flow of fresh air derived from engine bleed air. Typically, the mixing point for the bleed air and the compressed cabin air is at a point upstream of one or more expansion turbines associated with an ACM refrigeration pack. Various versions of this kind of cabin-air recirculation system are disclosed in U.S. Pat. Nos. 2,477,931 issued to King; 2,491,462 issued to Wood; 4,021,215 issued to Rosenbush and 3,097,508 issued to Leech et al. Like the fan-powered recirculation system discussed above, the use of a compressor to recirculate the cabin air as part of the primary ACM refrigeration system achieves air recirculation only at the expense of fuel burn.

In other air conditioning systems, it is known to use the potential energy available from the differential pressure that exists between a pressurized aircraft cabin and ambient air, in order to power, at least in part, certain of the fresh-air supplying components of an air conditioning system. However, a turbine powered in this manner is typically used to augment the drive for one or more of the compressor stages of the primary fresh-air supplying system, such as an ACM, or to drive a simple fresh air supply that draws in fresh, ambient air. Examples of air conditioning systems in which the primary supply is in part powered by a cabin-to-ambient pressure differential are disclosed in U.S. Pat. Nos. 2,767,561 issued to Seeger; 2,734,356 issued to Kleinhans; and 2,777,301 issued to Kuhn.

Accordingly, it is an object of the present invention to reduce, in an overall efficient manner, the amount of engine bleed air required to supply conventional, aircraft cabin air conditioning systems used on pressurized aircraft without degrading ventilation rate. A related object is to provide a net reduction of the fuel burn needed to operate the aircraft's air conditioning system at an operational level that supplies adequate amounts of conditioned air to the passenger cabin for pressurization, heating and cooling, and circulates such air for adequate smoke removal and ventilation.

Another object is to provide a cabin air conditioning system that achieves the foregoing objectives and is capable of being easily and inexpensively retrofitted to pressurized cabin aircraft having ACM or Vapor Cycle Refrigeration packs.

Additional objects and advantages of the invention are to provide method and apparatus for conditioning recirculation air in a manner that does not require any additional, external power, electric or pneumatic, for its operation; and does not require a complex or expensive control system.

SUMMARY OF THE INVENTION

In accordance with the principles of the invention, an aircraft cabin air conditioning system is augmented by an air recirculation method and apparatus in which air is withdrawn from a first pressurized compartment within the aircraft, such as the passenger cabin or a cargo or equipment compartment, and is ducted to the input side of a power turbine, the discharge of which is in communication with ambient air through an overboard exhaust. The thusly powered turbine is mechanically connected to a recirculation air compressor for turning the compressor solely by power produced by the turbine in response to the pressure differential between the pressurized compartment from which the air is withdrawn and ambient air. An input side of the recirculation air compressor is connected by ducting to take in stale air existing in a pressurized compartment of the aircraft, to filter that air by forcing it through one or more air filters and to deliver the thusly reconditioned air to the aircraft cabin.

In one preferred form of the invention, the compressed recirclation air, warmed by the action of the recirculation compressor, is cooled prior to being reintroduced into the cabin by an air-to-air heat exchange with cooler air that is discharged at the outlet of the power turbine prior to such discharged air being dumped overboard. Also, a modulation valve is connected in power turbine discharge duct to selectively bypass the air-to-air heat exchanger which provides the cooling of the recirculation air, so that the amount of cooling imparted to the recirculation air by the heat exchanger can be regulated.

In the above-characterized form of the invention, the recirculation apparatus, including the power turbine, recirculation air compressor, air filter and heat exchanger, are combined with the primary air conditioning system including an ACM refrigeration pack. This combination involves connecting the outlet side of the recirculation air compressor, after such outlet has been passed through the air-to-air heat exchanger, to the output duct of the primary fresh air supply, where the recirculation air is mixed with the primary fresh air prior to being introduced into the aircraft cabin. The outlet side of the power turbine, after absorbing heat from the compressed, recirculation air and prior to being dumped overboard, is passed through the heat exchanger (or exchangers) of the ACM where the spent turbine air is used along with ram air to precool the engine bleed air.

In an alternative embodiment of the invention, which may be used for certain special applications, the air-to-air heat exchanger at the outlet sides of the power turbine and recirculation compressor is eliminated by connecting the input side of the recirculation compressor to draw air from a cargo compartment of the aircraft, where the air is several degrees cooler than in the flight deck/passenger cabin. The various compartments of the aircraft are normally interconnected so that primary fresh air flows first into the flight deck and passenger cabin and thence through interconducting vents into one or more cargo compartments located in the lower lobe of the aircraft fuselage. The environmental control of typical aircraft is such that the air is generally several degrees warmer in the compartments occupied by passengers than in the cargo compartment. Thus, by withdrawing the recirculation air from the cargo compartment, and with the unavoidable temperature rise due to compression in the recirculation compressor, recirculation air is obtained at a temperature equal or lower than the cabin air temperature. Accordingly, the output of the recirculation compressor in this embodiment is communicated directly back into the cabin, without requiring any cooling by the spent air from the power turbine.

Additionally in this special application of the recirculation system, the pressure differential for driving the power turbine is obtained by withdrawing pressurized air from still a different pressurized compartment or compartments within the aircraft, such as used for housing the electrical/avionics equipment or from a system commonly referred to as electronics/avionics cooling system. The above-ambient air pressure from such a compartment of cooling system has potential energy, but such energy is normally lost because the electrical/avionics cooling air is commonly dumped overboard for reasons explained herein. Rather than dumping this air directly overboard, it is communicated to the input side of the recirculation power turbine, driving the power turbine and hence the recirculation compressor, prior to being ducted overboard.

To provide a complete disclosure of the invention, reference is made to the appended drawings and the following description of certain particular and currently preferred embodiments.

DETAILED DESCRIPTION

Figure 1:
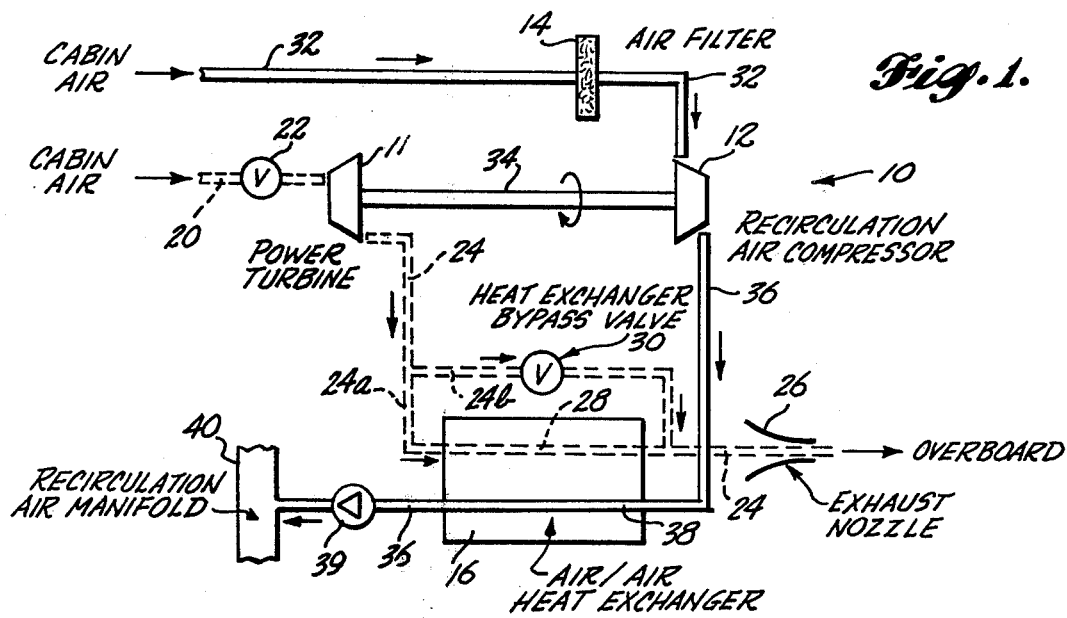
FIG. 1 is a schematic diagram of the cabin air recirculation system in accordance with one preferred embodiment of the invention.

With reference to FIG. 1, the principal components of one preferred form of cabin air recirculation system 10 include a power turbine 11, a recirculation air compressor 12, an air filter 14 and an air/air heat exchanger 16. An inlet side of power turbine 11 is in communication with cabin air through an inlet duct 20 (shown by dotted lines) which incorporates a shut-off valve 22. At the outlet side of turbine 11, a discharge duct 24 (again shown by dotted lines) communicates the low pressure side of the turbine with ambient air via an overboard exhaust nozzle 26, disposed in accordance with known aircraft design criteria to recover at least some of the thrust from the discharged air. Between power turbine 11 and exhaust nozzle 26, discharge duct 24 splits into branches 24a and 24b which respectively conduct the discharge flow through a cool side 28 of heat exchanger 16 or through a valve 30 of the modulation type connected to bypass heat exchanger 16.

An input side of air compressor 12 is connected to draw stale air from the cabin through an inlet recirculation duct 32 and an air filter 14. The thusly filtered air is increased in pressure by compressor 12 and discharged into an outlet recirculation duct 36 which passes the recirculation air through the hot side 38 of heat exchanger 16. From heat exchanger 16, the recirculation air is ducted through a check valve 39 into a cabin air distribution manifold 40 (either in common with or separate from the fresh air distribution manifold) for returning the reconditioned air to the aircraft cabin.

In operation, as the aircraft gains altitude, the cabin-to-ambient pressure differential increases to a level sufficient to drive power turbine 11. With shut-off valve 22 open, cabin air enters duct 20 and expands in turbine 11 against the lower ambient pressure that is in communication with the outlet side of turbine 11 through duct 24. Shaft 34 is thus rotated, driving compressor 12, and as the cabin air expands in turbine 11, its pressure and temperature drop, commensurate with the amount of work expended in powering compressor 12.

The power generated by turbine 11 is absorbed by compressor 12 as the latter pulls stale air through filter 14, compresses it and delivers filtered, but higher pressure and temperature air to outlet duct 36. At this stage, the recirculation air has a temperature that may exceed the air temperature in the cabin. To cool this warmed air, the cooler air from turbine 11 is brought into heat exchange relation with the compressed recirculation air in heat exchanger 16. The amount of cooling of the recirculation air in heat exchanger 16 is regulated by modulating bypass valve 30 so as to selectively shunt part or all of the turbine discharge air across the heat exchanger 16, dumping this air directly overboard through nozzle 26. Thus for maximum cooling of the compressed recirculation air in duct 36, valve 30 is moved to the full closed position. Conversely to heat the cabin by introducing warmer air into manifold 40, bypass vavle 30 is fully opened so that heat exchanger 16 does not impart cooling to the recirculation air that has been heated by compressor 12. Modulated, intermediate positions of valve 30 can be used to regulate the recirculated air temperature. The modulating bypass valve control may be manual or automatic under the control authority of a cabin temperature controller.

Figure 2:
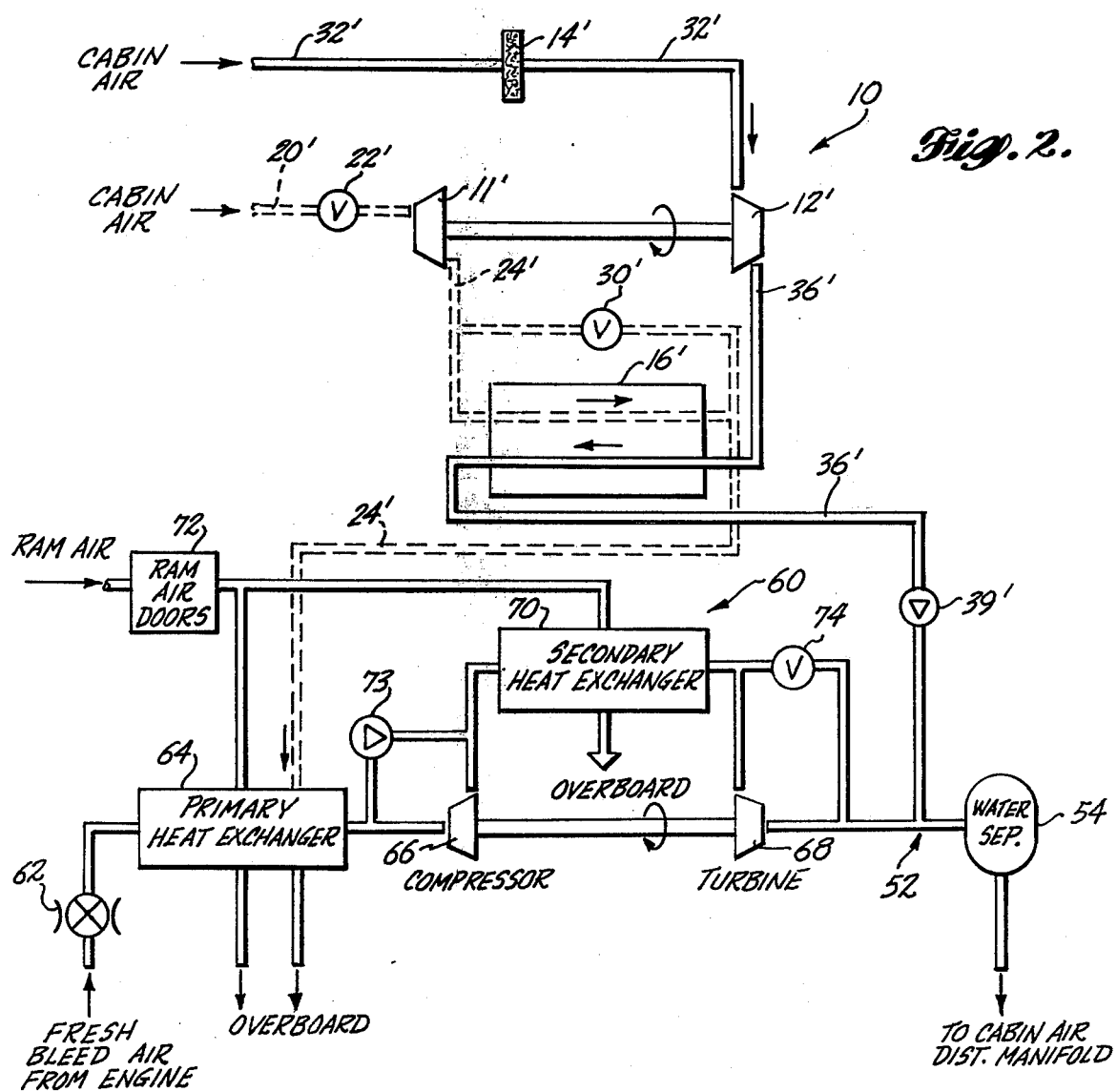
FIG. 2 is also a schematic diagram in which the air recirculation system of FIG. 1 is combined with a conventional bleed air conditioning system of the type having an ACM refrigeration pack.

In FIG. 2, the cabin air recirculation system of FIG. 1 has been integrated with a conventional, bleed air ACM refrigeration pack for delivering both fresh and recirculated air to an aircraft cabin. Primed reference numerals have been used in FIG. 2 to denote like components of the same reference numeral, shown in FIG. 1 and described above. Thus, in system 10' recirculated cabin air is fed from duct 32' through filter 14', compressor 12', heat exchanger 16' and delivered through a check valve 39' to a junction 52 at which the recirculated air is mixed with fresh bleed air and passed through a water separator 54 and hence communicated to the cabin air distribution manifold. The bleed air-/ACM refrigeration pack 60 includes a two mode combination flow control and shut-off valve 62 of conventional construction for receiving fresh bleed air from the aircraft engines, a primary heat exchanger 64, a boot-strap compressor 66 and an associated drive turbine 68, and a secondary heat exchanger 70. Controllable, ram air doors 72 regulate the amount of ram, cooling air channeled through primary and secondary heat exchanger 64 and 70, respectively, under the control authority of a thermostatic-type temperature controller (not shown) for maintaining a pre-selected cabin temperature. After the ram air has passed through heat exchanger 64 and 70 it is dumped overboard through ram air discharge openings (not shown) disposed for maximum thrust recovery. A controllable ACM bypass valve 74 is normally closed, but can be opened to operate, in conjunction with an upstream check valve 73 to cause the bleed air to bypass compressor 66 and turbine 68 for delivering relatively high temperature air to the cabin for heating purposes.

Figure 3:
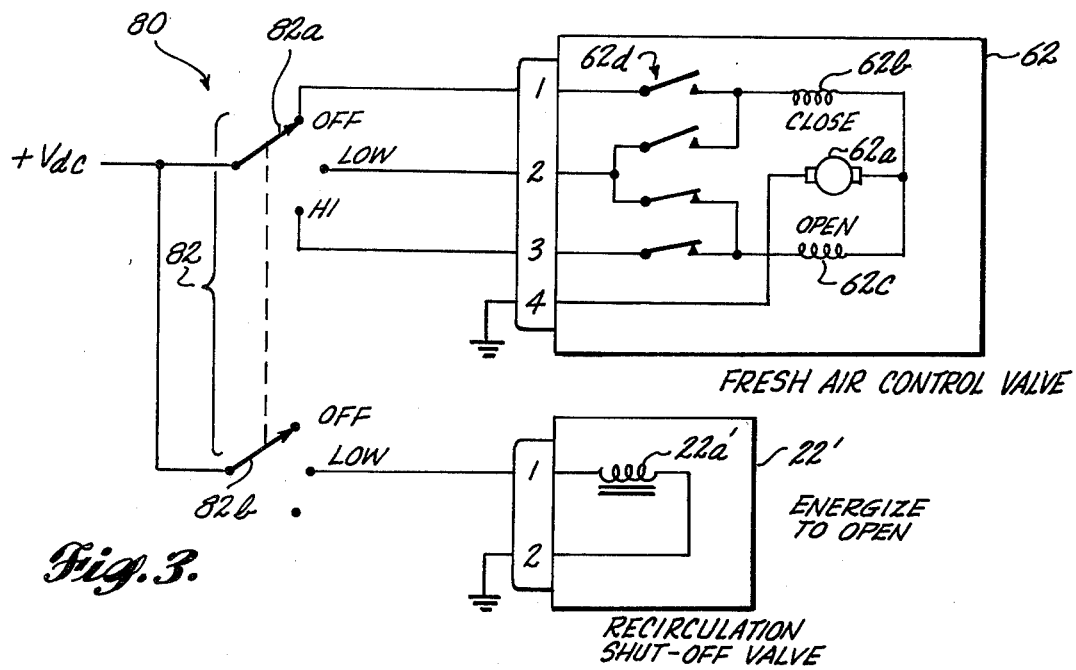
FIG. 3 is a schematic diagram of an electrical control circuit associated with the combined recirculation and primary air conditioning systems of FIG. 2.

In FIG. 3, an electrical controller 80 is illustrated for controlling the cabin recirculation shut-off valve 22' and fresh bleed air control and shut-off valve 62 of the integrated system of FIG. 2. Controller 80 includes a ganged, two-pole, three-position function switch 82 for connecting a supply voltage $+V_{dc}$ to the control inputs of recirculation shut-off valve 22' and fresh bleed air control and shut-off valve 62. Valve 62 incorporates a motor actuator 62a for selectively biasing valve 62 in fully-opened, fully-closed and intermediate positions by means of a closing winding 62b and an opening winding 62c. Windings 62b and 62c are selectively connected by multiple contacts of a valve program switch assembly 62d to input terminals #1, 2 and 3 of valve 62, which are in turn individually connected to off, low and high position contacts of a first pole 82a of function switch 82. The terminal #4 of valve 62 connects the return side of valve actuator 62a to ground.

Shut-off valve 22' for the recirculation system incorporates a valve actuator solenoid 22a' that normally disposes valve 22' in a fully-closed position, when unenergized, and opens valve 22' when energized via the low position contact of a second pole 82b of switch 82, connected to the terminal #1 of valve 22'. The return current path for solenoid 22a' is connected to ground through terminal #2. The off and high position contacts of pole 82b of switch 82 are open circuits such that when switch 82 is disposed in either of these positions, valve 22' is shut off (unenergized).

During operation of the integrated system shown in FIGS. 2 and 3, when function switch 80 of FIG. 3 is disposed in the off position, both the fresh air flow control valve 62 and the recirculation shut-off valve 22' are fully closed, thus shutting off all ventilation in the cabin. When switched to the high position, the recirculation valve 22' remains closed, and the fresh bleed air valve 62 is powered to a fully opened position for maintaining a predetermined, uniform, high-level flow of air through the ACM refrigeration pack 60, thereby delivering fresh, conditioned air to the cabin distribution manifold. In this mode, no recirculation air flows into mixing junction 52.

To activate the recirculation system, function switch 80 (FIG. 3) is switched to the low position thereby disposing the primary flow control valve 62 in an intermediate open position for delivering a uniform, predetermined volume of fresh bleed air to the ACM refrigeration pack 60 (FIG. 2). This reduced volume of air is conditioned by heat exchanger 64 and 70, compressor 66 and turbine 68, and delivered to the cabin distribution manifold. At the same time, recirculation shut-off valve 22' is opened, causing the cabin-to-ambient pressure differential to drive power turbine 11', with the spent turbine air being discharged through recirculation heat exchanger 16' and primary heat exchanger 64, before being dumped overboard. This spent turbine air, cooled by the expansion in turbine 11', cools both the recirculation air in exchanger 16' as discussed above in connection with FIG. 1, and also augments the cooling of the fresh, bleed air in heat exchanger 64. Recirculation air compressor 12' driven by turbine 11' draws in stale cabin air and delivers reconditioned cabin air to mixing junction 52, again in accordance with the above-description set forth in reference to FIG. 1. The added volume flow of recirculation air at junction 52 is accommodated by the reduced, fresh bleed air flow at valve 62, thereby reducing the bleed air requirement and hence the fuel burn needed to supply required cabin ventilation rate.

The recirculation mode includes a cooling submode and a heating submode. In the cooling submode, the bypass valve 30' of the recirculation heat exchanger 16' is closed, forcing all of the cooler discharge air from turbine 11' through exchanger 16' to absorb heat from the compressed, recirculation air. Additional cooling can be achieved in the usual manner by the ACM refrigeration pack 60. It will be observed however, that the amount of ram air cooling, which is less efficient because of the airplane drag imposed by its usage, is minimized by virtue of the more efficient recirculation air cooling achieved in heat exchanger 16'.

In a heating submode, bypass valve 30' is opened, causing the cooler turbine air to bypass heat exchanger 16' and thereby cause the uncooled, recirculation air in duct 36' to be delivered, without cooling, to mixing junction 52. This operation can be performed automatically, if desired, by sensing the position of ram air doors 72 and causing bypass valve 30' to open when doors 72 reach their close stop, signaling that the uncooled bleed air has reached the limit of its heating capacity. Further heating can also be obtained by opening turbine bypass valve 74 to cause the primary air to bypass the bootstrap compressor 66 and the associated expansion turbine 68.

It is thus evident that the ACM refrigeration pack 60 always operated in a mode so as to provide the required, conditioned air at the highest temperature compatible with the demands of a cabin temperature controller. By using the cooling capability of the recirculation system, minimal ram air is required for pack 60, thus providing a net improvement in the system efficiency by minimizing ram air drag.

The embodiment shown in FIGS. 2 and 3 incorporates the principles of the invention in a manual control system, in which function switch 82 of controller 80 is manually operated to select the desired air conditioning mode. In an alternative embodiment, it will be appreciated that the function of switch 82 can be automatically switched to dispose the air conditioning system in the recirculation mode, with the cabin-to-ambient differential pressure is adequate to satisfactorily operate the recirculation system. For this purpose, signals from cabin-to-ambient differential pressure sensor and cabin-/airplane altimeters can be processed to provide the desired automation for switching the system to the above-described low/high modes. Absent some unusual circumstance, it will be desirable to dispose the air conditioning system in the low mode, as described above, whenever the aircraft is cruising, in the high mode while descending, and in either the high or low (depending on ambient and passenger load conditions) when grounded, taking off or climbing.

In one particular implementation of system 10' that has been designed to provide approximately 130 pounds per minute of conditioned recirculation air during cruise, at an altitude of 35,000 ft., it has been projected that following operational parameters will be achieved. At such altitudes, the system is capable of delivering approximately 2 pounds of recirculated air for every one pound of spent air channeled through power turbine 11 and dumped overboard. Furthermore, in this system, the cooling capability of the recirculated air, during which bypass valve 30 is closed, will be approximately 60% of the cooling capacity of the fresh air delivered by the bleed air and associated ACM refrigeration pack. In a heating mode, with bypass valve 30 fully open, the heating capability of the recirculated air is approximately 75% of the heating capacity of the fresh, ACM discharge air. Also, it is observed that the isentropic thrust loss of the spent cabin air channeled through power turbine 11, is less when the recirculation system is in the cooling mode (valve 30 closed) than when the system is in the heating mode (valve 30 open), due to the heat transfer in exchanger 16 that occurs when in the cooling mode.

Figure 4:
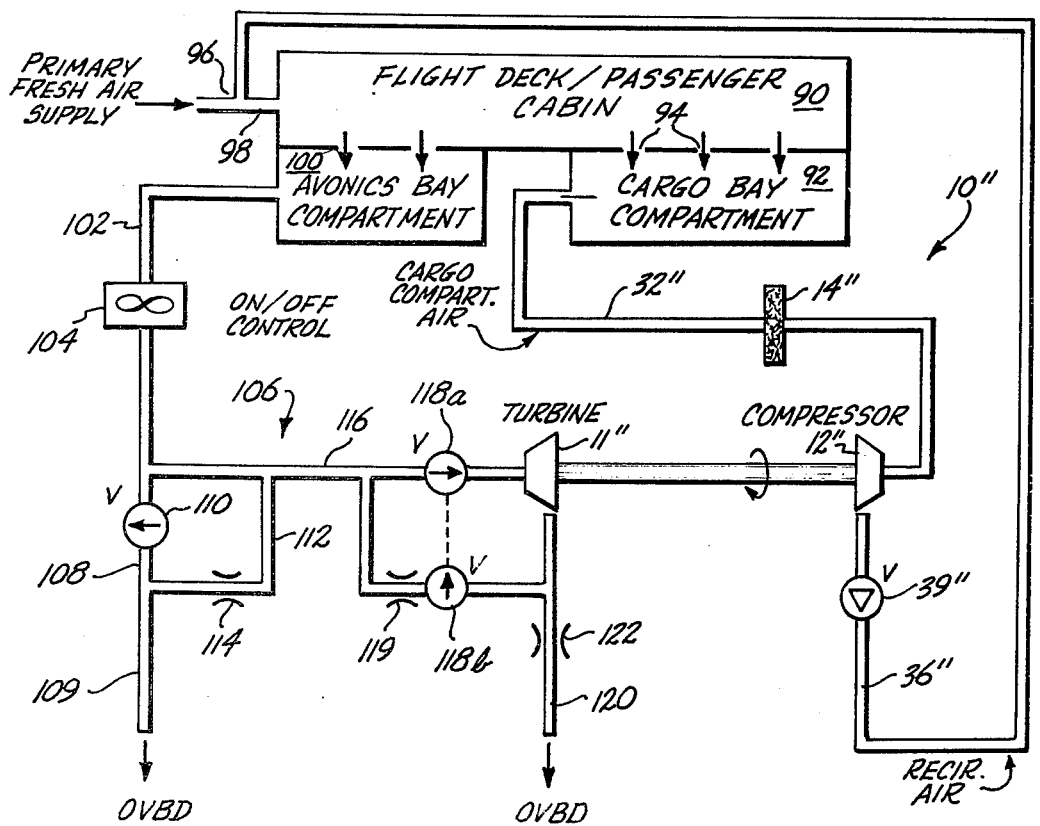
FIG. 4 is a schematic diagram of an alternative embodiment of the invention preferred for certain special applications as described more fully hereinafter.

In FIG. 4, an alternative, preferred form of the invention is shown in which the air pressure differential used to drive the expansion turbine for the recirculation system is obtained from an equipment compartment, such as the avionic bay, and the supply of recirculated air is derived from a pressurized compartment of the aircraft, such as a cargo bay, where the temperature is usually several degrees colder than the cabin temperature. Thus, in FIG. 4, the recirculation system 10" of FIG. 4 includes a power turbine 11" turning a recirculation air compressor 12", and a filter 14" connected in series with an inlet recirculation air duct 32". Duct 32" is connected to receive stale air that has first passed through the flight deck/passenger cabin 90, and then has entered cargo bay compartment 92 through interconnecting vents 94. Thus the stale air from cabin 90 ultimately reaches the recirculation inlet duct 32", but only after being mixed with the lower air temperature that exists within compartment 92 as compared to the passenger cabin.

The outlet of recirculation air compressor 12" is connected by an outlet duct 36" through a check valve 39" back to a mixing junction 96, where the reconditioned, recirculation air is mixed with the fresh bleed air from the fresh air ACM cooled supply, and communicated to the flight deck and passenger cabin distribution manifold 98.

For driving turbine 11", pressurized air that has been circulated through the avionics equipment in the avionics compartment 100 is channeled by an air duct 102 through a selectively operated blower 104 and hence through a valve and venturi network 106 that channels the air either overboard or through power turbine 11". More particularly, network 106 includes a first branch duct 108 incorporating a conventional aerodynamic flow control valve 110 and a bypass duct 112 including a venturi connected in bypass around valve 110. The outlet side of duct 108 is communicated overboard via a thrust recovering exhaust nozzle (not shown). Duct 102, blower 104 and the portion of network 106 including flow control valve 110 and bypass venturi 114 are provided as conventional components of the existing electrical/avionics cooling system on at least some currently manufactured aircraft and operate, as more fully described below, to maintain a relatively uniform volumetric flow of cooling air through avionics compartment 100.

Network 106 also includes a turbine inlet duct 116 that is connected to tap air from the avionics discharge duct 102 upstream of flow control valve 110 and to channel the tapped avionics air through a control valve 118a to the inlet side of turbine 11". Flow control valve 118a is mechanically linked to a bypass valve 118b and together valves 118a and 118b are operated in a correlative fashion to selectively channel the same volume of air either through power turbine 11" or directly overboard through a discharge duct 120 including a venturi 122 communicating with ambient air via a thrust-recovering exhaust nozzle (not shown). Airflow through the bypass valve 118b is passed through venturi 119.

In the operation of the recirculation system 10" of FIG. 4, when the aircraft is on the ground, air is drawn through the avionics of compartment 100 by switching blower 104 on so as to draw ambient air through duct 102. A majority of the thusly moved air is dumped overboard through flow control valve 110, which is fully open at such time. In this mode there is insufficient pressure in network 106 to operate turbine 11". After takeoff and climb, a differential pressure builds up in the aircraft fuselage and pressurized air originating in the flight deck/passenger cabin 90 is channeled into avionics compartment 100 where it is circulated through the avionics as described above. In this case, however, the circulation is forced by the cabin-to-ambient pressure differential that has built up due to the altitude of the aircraft and blower 104 is thus shut off.

As the aircraft continues to gain altitude, the cabin-to-ambient pressure differential increases to the point that flow control valve 110 closes off completely in order to maintain a uniform flow of air through duct 102 and hence through the avionics equipment in compartment 100. At such time, on a conventionally equipped aircraft, all of the avionics cooling air would be dumped overboard through discharge duct 109 via venturi 114.

Now in accordance with the recirculation system 10", a varying proportion of the avionics cooling air that would normally be dumped directly overboard and thus wasted, is channeled through duct 116 and valve 118a to power turbine 11" and hence turn recirculation air compressor 12". After performing the work needed to turn turbine 11" and hence compressor 12", the reduced pressure air is discharged overboard through the outlet of turbine 11", venturi 122 and duct 120.

The recirculation system 10", as shown in FIG. 4, has the advantage of utilizing the differential air pressure that is available from avionics compartment 100 to power the recirculation system, whereas in prior, conventional air conditioning systems, the avionics air is dumped overboard without extracting work. The primary reason for dumping this air overboard without using the differential pressure is that in the event of high temperature or fire or smoke contamination of the avionics air caused by malfunction of the avionics equipment, the contaminated air will be safely channeled overboard rather than being recirculated back into the flight deck/passenger cabin 90. In the case of recirculation system 10", this avionics air is still discharged overboard, but only after work is extracted from this air by turbine 11". The avionics air, even if it becomes contaminated, still has no opportunity to re-enter the flight deck/passenger cabin 90 because of the isolation of the recirculation air from the avionics cooling air. FIG. 4 shows the position of valves 110, 118a and 118b in flight when the recirculation system is operating. By reversing the position of valves (open to close and vice versa), the recirculation system can be stopped and the system returned to conventional system with cooling air discharging overboard.

When the aircraft altitude is high enough to produce sufficient cabin-to-ambient differential pressure, air recirculation system 10" has two alternative modes of operation. In a first mode, the amount of fresh air required of the ACM refrigeration pack can be reduced to a low flow level by activating the recirculation turbine 11" and compressor 12" of system 10". For this purpose, the mechanically-linked valves 118a and 118b are operated to open the former and close the latter to direct the avionics air through turbine 11" as described above. In such a mode, the flow control valve 110 is fully closed and venturi 114 limits the air flow through this branch of network 106, forcing most of the air through open valve 118a and turbine 11". The ducting and valve ports of network 106 are selected so that a uniform, volumetric air flow is achieved in duct 102 for the various operating positions of valves 110, 118a and 118b to achieve a predetermined amount of cooling in the avionics compartment 100.

To operate in a mode that supplies maxiumum fresh air to flight deck/passenger cabin 90, the recirculation air is cut off by closing valve 118a and opening valve 118b. In this mode, the avionics air is shunted past turbine 11", stopping recirculation air compressor 12" and thus shutting off the flow of recirculation air.

The foregoing modes of low and high fresh air flow correspond to the above-described low and high operating modes of the above-described, integrated air conditioning system as shown in FIGS. 2 and 3.

While only certain particular embodiments of the invention have been disclosed herein, it will be readily apparent to persons skilled in the art that numerous changes and modifications can be made thereto, including the use of equivalent means, devices and method steps, without departing from the spirit of the invention. For example, air normally dumped overboard from the lavatories, or any other compartment, can be channelled to drive the power turbine of the recirculation system.

We claim:

1. In an air conditioning system having a primary air supply for introducing fresh air into the interior of an aircraft, and wherein the aircraft has a first compartment that is, during at least certain flight conditions, maintained at a pressure higher than that of ambient air surrounding the exterior of the aircraft, the improvement in said air conditioning system of a recirculation air supply, comprising:
    an air driven turbine means including an air input and an air output;
    first duct means for ducting air from said first compartment to said input of said turbine means;
    second duct means for ducting air from said air output of said turbine means to an overboard exhaust in communication with ambient air so as to power said turbine means by the differential pressure existing between air in said first compartment and ambient air;
    a source of filtered stale air available from the interior of said aircraft;
    air compressor means having an air input and an air output;
    third duct means for ducting said filtered stale air from said source thereof to said input of said compressor means; and
    fourth duct means for receiving filtered and compressed air discharged at the output of said air compressor means and for recirculating said filtered and compressed air back into the interior of the aircraft.

2. The improvement set forth in claim 1 further comprising an air-to-air heat exchanger means cooperatively connected with said second and fourth duct means for transferring heat from said filtered, compressed air flowing in said fourth duct means to relatively cooler air discharged by said turbine means and flowing in said second duct means.

3. The improvement set forth in claim 2 further comprising valve means associated with said second duct means and said air-to-air heat exchanger means for selectively causing air discharged by said turbine means to bypass said air-to-air heat exchanger means and flow from said outlet of said turbine means to said overboard exhaust.

4. The improvement set forth in claim 1 wherein the aircraft has a passenger cabin that is to receive the fresh air provided by said primary air supply and recirculated air provided by said recirculation air supply, and wherein said forth duct means includes means for ducting said filtered, compressed air from said outlet of said compressor means to said passenger cabin.

5. The improvement set forth in claim 4 wherein said first compartment of said aircraft comprises said passenger cabin, and wherein said source of filtered, stale air comprises filter means cooperatively associated with said third duct means so that said filtered, stale air is provided by filtering air withdrawn from said passenger cabin.

6. The improvement set forth in claim 4 wherein said first compartment comprises an equipment bay of said aircraft, whereby said turbine means is powered by differential pressure that exists between air in said equipment bay and ambient air.

7. The improvement set forth in claim 4 wherein said source of filtered, stale air comprises a cargo bay of said aircraft and means for withdrawing and filtering air from said cargo bay and introducing it into said third duct means.

8. The improvement set forth in claim 1 wherein said source of filtered, stale air comprises a second compartment of said aircraft and means for withdrawing stale air from said second compartment, means for filtering said stale air withdrawn from said second compartment and means for introducing the thusly filtered, stale air into said third duct means.

9. The improvement set forth in claim 8 wherein said aircraft has a third compartment, and wherein said fourth duct means includes means for ducting said filtered, compressed air supplied at said air discharge of said compressor means to said third compartment.

10. The improvement set forth in claim 9 wherein said third compartment comprises a passenger cabin in said aircraft.

* * * * *